INVENTOR:
JOSEPH KLOPAK,
BY
HIS ATTORNEY

Patented June 10, 1941

2,245,281

UNITED STATES PATENT OFFICE 2,245,281

SEAL

Joseph Klopak, Newark, N. J., assignor to General Motors Corporation, Detroit, Mich., a corporation of Delaware Application April 13, 1938, Serial No. 201,784

4 Claims. (Cl. 286—5)

This invention relates to seals and preferably to seals of the labyrinth type for relatively rotatable members.

An object of this invention is to provide a simple and improved labyrinth type seal between two relatively rotatable members and which will keep a fluid lubricant from flowing through the seal in one direction and will prevent the passage of water and other deleterious substances through the seal in an opposite direction, and a further object is to provide a self-draining seal which is not subject to wear.

To these ends, and also to improve generally upon devices of the character indicated, the invention consists in the various matters hereinafter described and claimed.

Figures 1, 2, 3:
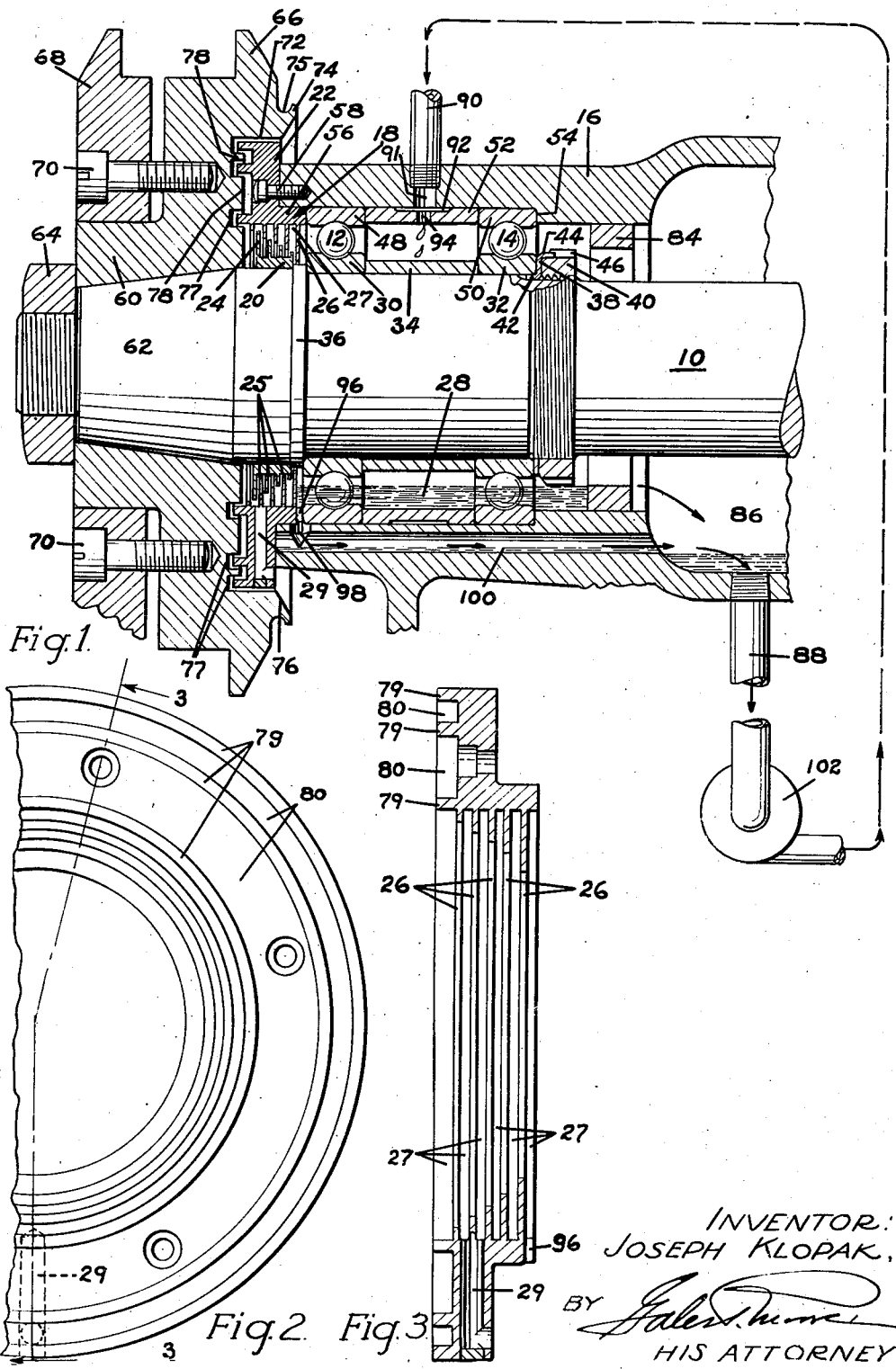
Figure 1 is a view chiefly in longitudinal section through a shaft and a bearing and showing one application of my seal.
Figure 2 is an enlarged fragmentary end view of the outer sealing element.
Figure 3 is a sectional view taken along the line 3—3 of Figure 2 and looking in the direction of the arrows.

Generally stated, a shaft 10 is rotatably supported by the spaced ball bearings 12 and 14, mounted in a lubricant chamber 28 in the housing 16, and a labyrinth type seal 18, which closes the outer end of the chamber 28, has an inner rotatable element 20 secured on the shaft 10 and an outer non-rotatable element 22 secured to the housing and surrounding the inner element, the inner and outer elements being respectively provided with the spaced, annular lubricant baffles or slingers 24 and the interposed annular baffles 26, these alternating slingers and baffles being of such diameters as to form between them an annular, stepped labyrinth which effectively provides a fluid seal at the end of the chamber 28 and which drains to the passage 29 in the lower outer end of the non-rotatable element 22 so that water and other deleterious substances cannot accumulate in the seal and pass through the labyrinth into the chamber 28.

The inner race rings 30 and 32 of the bearings 12 and 14, mounted on the shaft 10 and separated by a spacing collar 34, are clamped between the shaft flange 36 and a washer 38 by a nut 40 threaded on the shaft 10, the washer 38 being provided with an inwardly extending lug 4? received in a keyway in the shaft 10 and an outwardly extending lug 44 bent over into locked engagement within one of a plurality of slots 46 in the nut 40 to prevent the nut from loosening from adjusted position. The outer race rings 48 and 50, which are slidably received in the housing 16 and separated by a spacing collar 52, are held between a shoulder 54 of the housing and an inwardly projecting flange 56 of the element 22 which is secured by the screws 58 in abutting, sealing relation against the end of the housing 16.

A hub 60 is tightly secured on the tapered end 62 of the shaft 10 by a nut 64 threaded on the reduced end of the shaft, and a grinding wheel, not shown, may be removably clamped on the hub between the hub flange 66 and a clamping ring 68 supported by the hub 60 and held in position by the screws 70. The inner end of the hub is counterbored at 72 and overlies the outer, non-rotatable element 22 in spaced relation, and an annular, slinger flange 74, which laterally extends from the inner end of the hub 60, has a peripheral groove 75 and a conical inner wall 76 that extends outwardly from the counterbore 72 to aid in throwing off water and other foreign substances which tend to enter between the hub and the seal during a hub rotation. The hub within the counterbore is also provided with the laterally disposed, annular grooves 77 and the annular ribs 78 which respectively receive in spaced relation the correspondingly formed annular ribs 79 and the annular grooves 80 in the outer end of the sealing element 22 to form a labyrinth between the relatively rotating parts and which further restricts access of water and other deleterious substances to the bearings.

The non-rotatable outer element 22 has each of the succeeding bores through the baffles 26 of a smaller internal diameter with the innermost baffle 26 of the least internal diameter and closely surrounding but out of contact with the shaft flange 36 and laterally spaced from the bearing 12. The rotatable inner element 20, which is pressed over the shaft 10 against the flange 36, has the spaced slingers 24 of succeedingly lesser external diameters with the innermost slinger of least external diameter and adjacent the flange 36. Each of the rotatable slingers 24, which is spaced between a pair of the baffles 26, has an external diameter intermediate the internal diameters of the adjacent non-rotatable baffles 26. With this construction the inner sealing element 20 may be slid over the shaft within and spaced from the outer element 22 to provide a substantially conical, stepped, annular labyrinth type of seal in which the slingers 24 rotate in the annular grooves 27 with the non-rotatable baffles 26 located in the annular grooves 25. The drain passage 29 in the lower portion of the element 22 communicates at its upper end with the bottoms of the two shallow outer grooves 27 nearest to the hub 60 and has its lower end located beneath the housing and out of the counterbore 72 so that water and other deleterious substances which find their way into the seal from the counterbore 72 cannot pass through the seal to the bearings but will be collected in the two outer grooves 27 and withdrawn through the passage 29. In the event that water should collect in the other grooves 27, the stepped annular formation of the succeedingly larger baffles 26 will act as ribs or dams which prevent the flow of water and deleterious matter towards the bearing 12 and which serve to drain the water back over the successively lower dams and into the preceeding shallower grooves 27 and out through the passage 29.

The inner end wall of the chamber 28 is formed by a ring 84 pressed into the housing 16 at the other side of the nut 40 from that of the bearings, and the bore through this ring 84 is considerably larger than the bore through the innermost baffle 26, which forms the outer wall of chamber 28, so that lubricant in the chamber 28 will overflow through the ring 84 into a chamber 86 of the housing from which it is withdrawn through a pipe 88. Hence, the space between the bottom of the flange 36 and the innermost baffle 26 is always located above the level of the lubricant in the chamber 28 and the lubricant is prevented from passing out through the seal 18.

A fluid lubricant, such as oil, is entered through an infeed pipe 90, threaded in a bore 91 in the top of the housing 16, after which the lubricant passes through a peripheral groove 92 and a bore 94 in the collar 52 into the chamber 28. Lubricant drains from the outer end of the chamber 28 through a drain groove 96, provided in the bottom of the flange 56 between the innermost baffle 26 and the bearing 12, into a bore 98 from which it enters the chamber 86 through a bore 100 in the lower portion of the housing 16. I preferably connect the exhaust pipe 88 with a suitable pump 102 which returns the lubricant to the infeed pipe 90 so that the lubricant may be continuously circulated through the bearings 12 and 14 to provide the required cooling and lubrication.

I claim:

1. In a device of the character indicated, a housing having a lubricant chamber, a shaft rotatably mounted in said chamber, a hub carried by the shaft and having a counterbore, an annular non-rotatable member received in said counterbore and secured to the housing about the shaft, co-operating spaced annular projections on the hub and on said non-rotatable member providing a labyrinth, an inner rotatable member on the shaft within said non-rotatable member, and alternating spaced baffles and slingers respectively secured to the non-rotatable member and to the inner rotatable member and providing a separate conically stepped annular labyrinth which seals one end of said chamber; substantially as described.

2. In a device for closing one end of the annular lubricant chamber between a rotatable shaft and a housing, axially spaced annular baffles in said housing and surrounding the shaft at the end of said lubricant chamber, the baffles having successively larger coaxial central bores with the innermost baffle having the bore of least diameter and closely surrounding said shaft and forming a dam at one end of the lubricant chamber, means on the shaft co-operating with said dam to close the end of said chamber, annular radially outwardly extending slingers on the shaft independent of said means and respectively aligning with the spaces between the baffles, and each slinger having an external diameter between the inner diameters of the baffle bores at each side thereof.

3. A member for closing the annular space between a rotary shaft and a housing to prevent the passage of foreign matter through said space, said member comprising a series of spaced substantially parallel annular baffles extending radially inwardly towards the shaft and which are respectively provided with bores of progressively larger diameters towards the entrance to said space, each pair of adjacent baffles forming an annular fluid collecting groove with a lower dam over which accumulated fluid can overflow to the next shallower groove, the innermost baffle having the bore of least diameter and closely surrounding said shaft, a shaft flange within said last mentioned bore and co-operating with said innermost baffle to substantially close the inner end of said annular space, and a series of annular slingers on the shaft and of successively greater external diameters towards the entrance to said space, and each slinger aligning with one of the grooves and having its external diameter larger than an adjacent baffle bore and smaller than the bore diameter of the companion overflow baffle.

4. A member for closing the annular space at one end of a lubricant chamber between a rotary shaft and a housing to prevent the passage of foreign matter through said space into said lubricant chamber, said member comprising a series of spaced annular baffles extending radially inwardly towards the shaft and which are respectively provided with bores of progressively larger diameters towards the entrance to said space and away from said lubricant chamber, a flange on the shaft at the end of the lubricant chamber, the innermost baffle having the bore of least diameter and forming a dam closely surrounding said flange, each pair of adjacent baffles forming an annular fluid collecting groove therebetween with a lower dam at the side towards said entrance so that accumulated fluid may overflow the successively lower dams into one of the shallower grooves, and said member having a drain passage communicating with said shallower groove and directing accumulated fluid from said grooves away from the lubricant chamber.

JOSEPH KLOPAK.